Dec. 1, 1942.  H. WHITTLE  2,304,044

VOLTAGE REGULATION AND RECTIFICATION

Filed Aug. 15, 1941

INVENTOR
H. WHITTLE
BY
Ralph T. Holcomb
ATTORNEY

Patented Dec. 1, 1942

2,304,044

UNITED STATES PATENT OFFICE 2,304,044

VOLTAGE REGULATION AND RECTIFICATION

Horace Whittle, Maplewood, N. J., assignor to Bell Telephone Laboratories, Incorporated, New York, N. Y., a corporation of New York Application August 15, 1941, Serial No. 407,019

22 Claims. (Cl. 171—242)

This invention relates to the regulation and rectification of alternating voltages.

An object of the invention is to derive a substantially constant voltage from a source of alternating electromotive force which varies between wide limits.

Another object is to improve the regulation obtainable from a voltage regulator.

Another object is to increase the efficiency of a voltage regulator.

A further object of the invention is to derive a substantially constant, unidirectional voltage from a variable, alternating voltage source.

It is often required to regulate closely a widely varying alternating electromotive force, with as little energy loss as possible. It is further often required to change the regulated alternating voltage into a unidirectional voltage of constant value.

In accordance with the present invention a variable electromotive force is transformed, regulated, rectified and filtered, with high efficiency, to provide a unidirectional voltage that is constant in value within very close limits. The system comprises a transformer, to the primary winding of which the variable source of alternating electromotive force is connected, and, following in tandem, a voltage regulating network, a rectifier and a smoothing filter. In some instances the transformer may be omitted and, if an alternating voltage output is desired, the rectifier and filter also may be omitted.

The voltage regulating network is preferably of an improved bridge or lattice type in which one impedance branch of a pair includes a capacitor and the other branch of the pair includes an inductor, tuned to resonate at or near the frequency of the source, and each of the other impedance branches includes one or more non-ohmic resistors the resistance of which either decreases or increases with an increase in current. An improvement in the voltage regulation may be obtained by associating an ordinary ohmic resistor with the non-ohmic resistor or resistors. The ohmic resistor is connected in series with the non-ohmic resistor if the resistance of the latter decreases with current and in parallel therewith if the resistance increases with current. The rectifier may be an ordinary bridge network employing, for example, copper-oxide units. The smoothing filter is preferably also a bridge network comprising a pair of ohmic resistors and a pair of non-ohmic resistors. A capacitor of large capacitance may be connected in shunt at the input end of the filter to increase the output of direct current and absorb the large ripples.

The nature of the invention will be more fully understood from the following detailed description and by reference to the accompanying drawing in which like reference characters refer to similar parts and in which.

Figure 6:
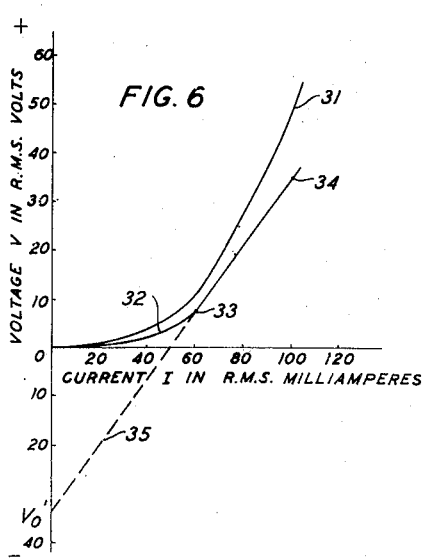
Figure 5:
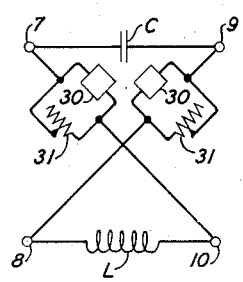
Fig. 5 is a schematic circuit of another form of the voltage regulator.

Fig. 6 gives the voltage-current characteristic of a typical non-ohmic resistor suitable for use in the network of Fig. 5.

Figure 1:
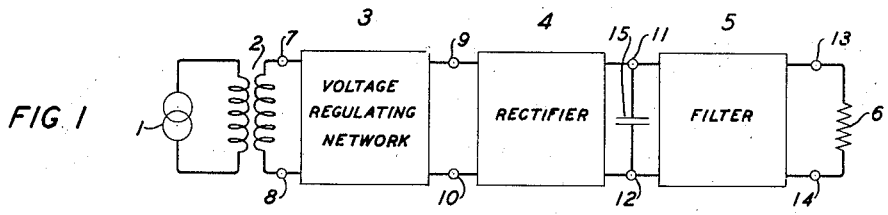
Fig. 1 shows diagrammatically a voltage regulating and rectifying system in accordance with the invention.

Taking up the figures in more detail, Fig. 1 shows diagrammatically a voltage regulating and rectifying system in accordance with the invention comprising a source of variable alternating electromotive force 1, a coupling transformer 2, a voltage regulating network 3, a rectifier 4, a smoothing filter 5 and a load impedance 6. The source 1 is connected across the input winding of the transformer 2, the output winding of which is connected to the input terminals 7 and 8 of the regulating network 3. The network 3, the rectifier 4 and the filter 5 are all connected in tandem and the load 6 is connected to the output terminals 13 and 14 of the filter 5. The transformer 2 is used to raise or lower the voltage of the source 1 so that it falls within the range over which the regulating network 3 operates. The network 3 regulates the voltage to a substantially constant root mean square value and the rectifier 4, which is of the full-wave type, rectifies the voltage. The capacitor 15, connected across the input terminals 11 and 12 of the filter 5, increases the direct voltage level and absorbs the large ripples. The filter 5 passes direct current but removes the small remaining ripples.

Figure 2:
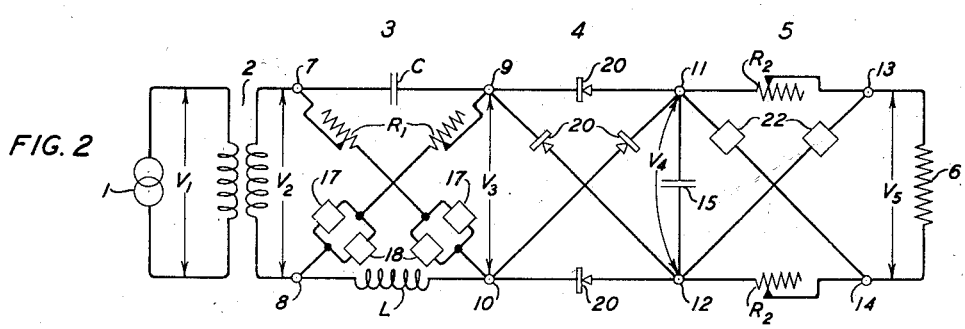
Fig. 2 is a schematic circuit of one embodiment of the system shown in Fig. 1.

Fig. 2 is a schematic circuit of a specific embodiment of the system of Fig. 1. The variable alternating voltage from the source 1, which has a root mean square value of $V_1$, is transformed by the transformer 2 to a root mean square value of $V_2$ and is regulated by means of the voltage regulating network 3 to a substantially constant root mean square value of $V_3$. The network 3 is of the bridge or lattice type comprising a capacitor C in one series branch, an inductor L in the other series branch and a variable resistor $R_1$ in series with two parallel-connected non-ohmic resistors 17 and 18 in each diagonal branch. Two non-ohmic resistors are used in parallel to increase the current carrying capacity of the branch. The rectifier 4, also of the bridge type, has in each arm a rectifying element 20 which may be a copper-oxide disc. The rectifier 4 changes the alternating voltage $V_3$ to direct voltage of value $V_4$. The shunt capacitor 15 is of large capacitance and its function is to absorb the large ripples in the voltage $V_4$. The smoothing filter 5 absorbs the remaining ripples and delivers a substantially constant direct voltage $V_5$ to the load 6. The filter 5 is of the lattice type, comprising a variable resistor $R_2$ in each series branch and a non-ohmic resistor 22 in each diagonal branch.

Figure 4:
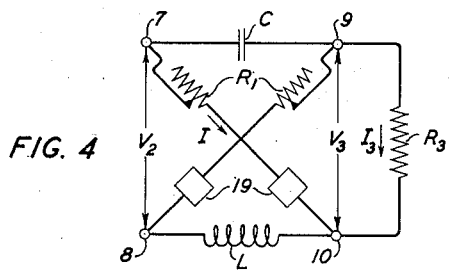
Fig. 4 is a circuit of one form of the voltage regulating network and is used in explaining the invention.
Figure 3:
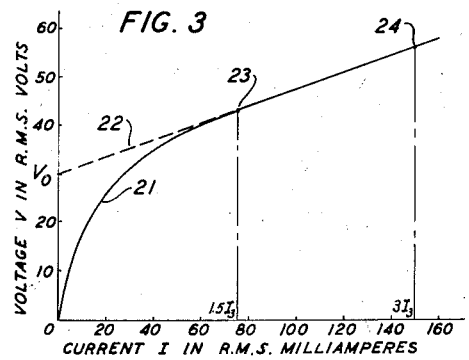
Fig. 3 is a voltage-current characteristic of a typical non-ohmic resistor suitable for use in the circuit of Fig. 2.

A method of designing the voltage regulating network 3 will now be presented, with reference to Figs. 3 and 4. The network shown in Fig. 4 is the same as that shown in Fig. 2 between input terminals 7, 8 and output terminals 9, 10 except that the two non-ohmic resistors 17 and 18 in each diagonal impedance branch are replaced by a single equivalent non-ohmic resistor 19. The resistance $R_3$ represents the impedance looking to the right at terminals 9 and 10 in Fig. 2. In the event that the rectifier 4 and filter 5 are omitted the resistance $R_3$ will be the load 6. The voltage-current curves of Fig. 3 are used to illustrate a simple graphical method of design.

At the angular frequency $\omega$ of the source 1 the two reactive branches of the lattice have reactances which are equal, or approximately equal, in magnitude but opposite in sign, and each is equal in magnitude to a constant $K$ times the load impedance $R_3$. The values of L and C are, therefore, found as follows:

$$L = \frac{KR_3}{\omega} \quad (1)$$

$$C = \frac{1}{\omega KR_3} \quad (2)$$

For maximum efficiency $K$ should be approximately 0.7. However, a wide range in the choice of $K$ is permissible and under some circumstances a larger value of $K$ will increase the voltage range over which close regulation is secured. In one circuit tested the widest voltage range was obtained for a value of $K$ slightly greater than 3.

It is assumed that the resistance of the non-ohmic resistor 19 decreases with increasing current and therefore the resistor $R_1$ is connected in series therewith. In order for the network 3 to regulate over a range of about two to one for the input voltage $V_2$ the resistor $R_1$ should be equal to approximately one-half of the impedance of each reactive branch at the frequency $\omega$. For this condition the value of the resistor $R_1$ is therefore $$R_1 = \frac{KR_3}{2} \quad (3)$$

It remains now only to determine the required characteristic of the non-ohmic resistor 19. A typical characteristic of a suitable silicon carbide unit is shown by the curve 21 of Fig. 3 which is a plot of the voltage V in root mean square volts applied to the unit against the resulting current I in root mean square milliamperes at the frequency $\omega$. For low values of voltage the unit obeys Ohm's law but for higher values the resistance decreases and well above the knee, between the points 23 and 24, the curve straightens out and has a substantially constant slope for a considerable distance. If this straight part of the curve is extended to the V axis as shown by the dotted line 22 it makes an intercept at $V_0$ and the equation of this line is $$V = V_0 + R_4 I \quad (4)$$

where $R_4$ is a resistance the value of which is given by the slope of the line 22. An analysis of the circuit of Fig. 4 shows that the output voltage $V_3$ will be substantially constant for all values of I at which the sum of $R_1$ and $R_4$ is equal in magnitude to the reactance of each reactive branch at the frequency $\omega$. The required value of $R_4$ is therefore $$R_4 = KR_3 - R_1 \quad (5)$$

The slope of the line 22 is thus determined.

A further analysis shows that the value of $V_0$ in terms of the output voltage $V_3$ is approximately $$V_0 \doteq \frac{V_3(1+K)}{\sqrt{2}} \quad (6)$$

The intercept $V_0$ of the line 22 is thus fixed.

It will be assumed that regulation is to occur over the range where the current I is between 1.5 and 3 times the load current $I_3$. This determines the points 23 and 24 between which the curve 21 must approximately coincide with the line 22. The non-ohmic resistor 19 is, therefore, selected to have a characteristic which follows the line 22 as closely as possible between the points 23 and 24. This can be done by choosing an appropriate element and, if necessary, by using a number of elements in series to build up the required voltage or a number in parallel to accommodate the required current without overheating.

The root mean square value of the input voltage $V_2$ at any point within the operating range of the current I is given by $$V_2 = KR_3 I \left[ \frac{2A + B + A^2 B}{\sqrt{(A+B)^2 + (AB+1)^2}} \right] \quad (7)$$

where A is the ratio of the impedance of a non-reactive branch to that of a reactive branch at the frequency $\omega$, that is, $$A = \frac{R_1 + \frac{V}{I}}{KR_3} \quad (8)$$

and B is the ratio of the impedance of the load to that of a reactive branch at the frequency $\omega$, or, $$B = \frac{1}{K} \quad (9)$$

The values of $V_2$ at the limits of the operating range are found by solving Equation 7 using the values of A corresponding, respectively, to the points 23 and 24 in Fig. 3.

In order to make the method of design clearer an example will be presented. Assume that the frequency of the source 1 is 60 cycles per second, that a constant voltage $V_3$ of 25 volts is to be maintained across a load $R_3$ of 500 ohms, giving a load current $I_3$ of 50 milliamperes, and that the constant $K$ is chosen as 0.7, for maximum efficiency. Then, from Equation 1 the value of the inductance L is $$L = \frac{0.7 \times 500}{2\pi 60} = 0.928 \text{ henry}$$

from Equation 2 the value of the capacitance C is $$C = \frac{1}{2\pi 60 \times 0.7 \times 500} = 7.56 \text{ microfarads}$$

and from Equation 3 the value of the resistance $R_1$ is $$R_1 = \frac{0.7 \times 500}{2} = 175 \text{ ohms}$$

From Equation 5 $R_4$, which is the slope of the line 22, is $$R_4 = 0.7 \times 500 - 175 = 175 \text{ ohms}$$

and the intercept $V_0$ is found from Equation 6 to be $$V_0 = \frac{25(1+0.7)}{\sqrt{2}} = 30 \text{ volts}$$

The line 22 may now be drawn, since its slope and starting point have been determined.

Assume that the network is to regulate over the range in which the current I falls between $1.5I_3$ and $3I_3$. The value of I at the point 23 is, therefore, $$I = 1.5 \times 50 = 75 \text{ milliamperes}$$

and at the point 24

$$I = 3 \times 50 = 150 \text{ milliamperes}$$

The voltage-current characteristic 21 of the element 19 must, therefore, be a straight line as nearly as possible between the points 23 and 24.

At the point 23, where the current I is 75 milliamperes, the voltage V is 43 volts, and at the point 24, where I is 150 milliamperes, V is 56. From Equation 3 the values of the factor A at the points 23 and 24 are, respectively, $$A = \frac{175 + \frac{43}{75}}{0.7 \times 500} = 2.14$$

and $$A = \frac{175 + \frac{56}{150}}{0.7 \times 500} = 1.57$$

From Equation 9 the factor B is $$B = \frac{1}{0.7} = 1.428$$

The range of the input voltage $V_2$ is found from Equation 7 by substituting first $I=.075$, $A=2.14$ and $B=1.428$ giving $$V_2 = 0.7 \times 500 \times .075 \left[ \frac{2 \times 2.14 + 1.428 + 2.14^2 \times 1.428}{\sqrt{(2.14+1.428)^2 + (2.14 \times 1.428 + 1)^2}} \right] = 55.5 \text{ volts}$$

and then $I=.150$, $A=1.57$ and $B=1.428$ giving $$V_2 = 0.7 \times 500 \times .150 \left[ \frac{2 \times 1.57 + 1.428 + 1.57^2 \times 1.428}{\sqrt{(1.57+1.428)^2 + (1.57 \times 1.428 + 1)^2}} \right] = 95.0 \text{ volts}$$

Under the conditions assumed the network 3 will, therefore, give a substantially constant output voltage $V_3$ of 25 volts over a range of input voltage $V_2$ extending from 55.5 volts to 95 volts. If the voltage of the source falls within this range the transformer 2 may be omitted. Otherwise the ratio of the transformer is so chosen that the voltage $V_2$ stays within the required range.

Closer voltage regulation may be secured by limiting the operating range of the current 1, between the points 23 and 24, to less than that assumed. However, if this is done, the permissible limits on the input voltage $V_2$ will also be narrowed.

Also, closer regulation may be secured by making the slope of the line 22, which is equal to $R_4$, less than half of $KR_3$ but this also will decrease the permissible range of the input voltage $V_2$. If $R_4$ is decreased then $R_1$ should be increased correspondingly so as to satisfy Equation 5. On the other hand, if the input voltage $V_2$ varies only between rather close limits, the resistors $R_1$ may, under some circumstances, be omitted entirely.

The resistor $R_1$ may be made variable, as shown, so that its value may be adjusted to satisfy Equation 5 for a given element 19, or to correct for aging or changes in operating conditions that may affect the element 19 or other component elements of the network.

Furthermore, as already mentioned, the factor K need not be chosen as 0.7 but this value results in the greatest efficiency. If another value of K is used the design procedure and formulas given above are still applicable.

The rectifier 4 is of the full-wave type and may be designed in accordance with known methods.

The method outlined above may also be used in designing the smoothing filter 5 but in this network the series impedance branches $R_2$ are, of course, non-reactive, as it handles only direct current. The resistors $R_2$ may be made variable, as shown, for the same reason that the resistors $R_1$ in the network 3 are made variable.

As already pointed out, if a regulated alternating voltage is desired the networks 4 and 5 may be omitted and the utilization load 6 connected directly to the terminals 9 and 10. Also, if the variation in the voltage of the source 1 is small enough the regulating network 3 in Figs. 1 and 2 may be omitted.

Fig. 5 shows the circuit of a voltage regulating network in accordance with the invention using a non-ohmic resistor 30 the resistance of which increases with an increase in current. A suitable element of this type is a resistance lamp having a metallic filament. A typical voltage-current characteristic of such a lamp is given by the curve 31 of Fig. 6. The characteristic may be improved, however, by shunting the element 30 by an ohmic resistor 31 which may be made variable, as shown, to permit an adjustment of its value. Curve 32 of Fig. 6 gives the characteristic of the elements 30 and 31 connected in parallel. For a proper choice of the resistor 31 the characteristic may be made substantially a straight line between two points such as 33 and 34. An extension of this portion of the characteristic, as shown by the dotted line 35, has a negative intercept $V_0'$ on the V axis.

The values of L and C may be found from Equations 1 and 2 above. The value of $V_0'$ may be found from Equation 6 by substituting $V_0'$ for $V_0$. The characteristic of the element 30 and the value of the resistor 31 are then so chosen that the part of the curve over which regulation is desired, between points 33 and 34, has a slope equal to $KR_3$. The network of Fig. 5 may be used alone or in combination with a rectifier or a rectifier and smoothing filter in the same manner as is network 3 in Figs. 1 and 2.

If the voltage regulating network 3 is to be used in a place where the ambient temperature varies, the regulation may be improved by designing the resistor $R_1$ to have a temperature coefficient which is opposite in sign to that of the non-ohmic resistor 19. For example, if the resistor 19 is a silicon carbide unit having a negative temperature coefficient the resistor $R_1$ is designed to have a temperature coefficient which is positive and of such a value that throughout the temperature range of interest, the decrease in the resistance of the one element is compensated by an increase in the resistance of the other element. The required positive temperature coefficient may be provided for the resistor R₁ by including in its construction a suitable amount of iron wire.

What is claimed is:

1. A voltage regulating network for deriving a substantially constant root mean square voltage from a variable alternating source comprising two pairs of impedance branches arranged to form a lattice structure, each of one of said pairs of branches including a non-ohmic resistor and the remaining branches being reactive.

2. A network in accordance with claim 1 in which each of said non-ohmic resistors has connected in parallel therewith another non-ohmic resistor to increase the current carrying capacity of the branch with which it is associated.

3. A network in accordance with claim 1 in which the reactances of said remaining branches are of opposite sign at the frequency of said source.

4. A network in accordance with claim 1 in which at the frequency of said source said remaining branches have reactances which are of opposite sign and substantially equal in magnitude and the magnitude of each of which is less than the impedance of the load with which the network is to be associated.

5. A network in accordance with claim 1 in which the reactances of said remaining branches at the frequency of said source are of opposite sign and each is equal in magnitude to approximately 0.7 of the impedance of the load with which the network is to be associated.

6. A network in accordance with claim 1 in which the resistance of each of said non-ohmic resistors decreases with an increase of current therethrough.

7. A network in accordance with claim 1 in which the resistance of each of said non-ohmic resistors increases with an increase of current therethrough.

8. A network in accordance with claim 1 in which each of said non-ohmic resistors has associated therewith an ohmic resistor.

9. A network in accordance with claim 1 in which each of said non-ohmic resistors has an ohmic resistor connected in series therewith.

10. A network in accordance with claim 1 in which each of said non-ohmic resistors has an ohmic resistor connected in parallel therewith.

11. A network in accordance with claim 1 in which the resistance of each of said non-ohmic resistors decreases with an increase of current therethrough and each of said non-ohmic resistors has an ohmic resistor connected in series therewith.

12. A network in accordance with claim 1 in which the resistance of each of said non-ohmic resistors increases with an increase in current therethrough and each of said non-ohmic resistors has an ohmic resistor connected in parallel therewith.

13. A voltage regulating network for deriving a substantially constant root mean square voltage from a variable alternating source comprising two pairs of impedance branches arranged to form a lattice structure, each of one of said pairs of branches including a non-ohmic resistor and the remaining branches having reactances which at the frequency of said source are of opposite sign and substantially equal in magnitude.

14. A network in accordance with claim 13 in which the root mean square voltage versus root mean square current characteristic for each of said one pair of branches throughout the operating range of the network has a slope which is substantially equal in magnitude to the reactance of each of said remaining branches at the frequency of said source.

15. A network in accordance with claim 13 in which at the frequency of said source each of said remaining branches has a reactance which is less in magnitude than the impedance of the load with which the network is to be associated.

16. A network in accordance with claim 13 in which the reactances of said remaining branches at the frequency of said source are each equal in magnitude to approximately 0.7 of the impedance of the load with which the network is to be associated.

17. A network in accordance with claim 13 in which the root mean square voltage versus root mean square current characteristic for each of said one pair of branches throughout the operating range of the network has a slope which is substantially equal in magnitude to the reactance of each of said remaining branches at the frequency of said source and said slope is equal to approximately 0.7 of the impedance of the load with which the network is to be associated.

18. A network in accordance with claim 13 in which the resistance of each of said non-ohmic resistors decreases with an increase of current therethrough and each of said non-ohmic resistors has an ohmic resistor connected in series therewith.

19. A network in accordance with claim 13 in which the resistance of each of said non-ohmic resistors increases with an increase of current therethrough and each of said non-ohmic resistors has an ohmic resistor connected in parallel therewith.

20. A network in accordance with claim 13 in which each of said non-ohmic resistors has an ohmic resistor associated therewith, the root mean square voltage versus root mean square current characteristic for each of said one pair of branches throughout the operating range of the network has a slope which is substantially equal in magnitude to the reactance of each of said remaining branches at the frequency of said source and said slope is equal to approximately 0.7 of the impedance of the load with which the network is to be associated.

21. A voltage regulating network for deriving a substantially constant root mean square voltage from a variable alternating source comprising two pairs of impedance branches arranged to form a lattice structure, each of one of said pairs of branches including a non-ohmic resistor and an ohmic resistor connected in series, the remaining branches being reactive, and said ohmic resistor having a temperature coefficient which is opposite in sign to the temperature coefficient of said non-ohmic resistor.

22. A network in accordance with claim 21 in which said non-ohmic resistor includes a silicon carbide unit and said ohmic resistor has a positive temperature coefficient.

HORACE WHITTLE.